March 11, 1958 D. D. HOLMES 2,826,635
NOISE CANCELLING CIRCUITS
Filed Nov. 29, 1954

INVENTOR.
David D. Holmes
BY
ATTORNEY 2,826,635
Patented Mar. 11, 1958

2,826,635

NOISE CANCELLING CIRCUITS

David D. Holmes, Princeton, N. J., assignor to Radio Corporation of America, a corporation of Delaware Application November 29, 1954, Serial No. 471,703
11 Claims. (Cl. 178—7.3)

The present invention relates to improvements in noise cancellation circuits suitable for use in television receiving systems, and more particularly to improvements in television receiver synchronizing separator circuits whereby substantial noise immunity is realized through noise cancellation techniques.

More directly, the present invention relates to improvements in television synchronizing signal separating circuits of a type employing semiconductor amplifiers in a manner which permits complementary junction type transistors to be used for synchronizing signal detection and separation with a unique noise cancellation action.

It is a fundamental requirement in television receiving systems having a relatively high noise immunity that means be provided for separating from the incoming television signal the vertical and horizontal deflection synchronizing pulses in such a way that noise bursts have little effect on the wave form of the separated synchronizing pulses. It is fundamental that the effectiveness of the synchronizing signal separating action be made independent of received signal strength over a relatively wide range of signal intensities. The most direct approach to television synchronizing signal separation involves the use of an amplifier having a threshold acceptance characteristic whereby only signals in excess of a predetermined minimum amplitude are passed by the amplifier. Such an amplifier is often referred to as a signal clipper.

According to one form of the present invention two semiconductor amplifiers are connected to receive modulated I. F. signals from the television receiver I. F. amplifier. One semiconductor amplifier is operated as a variable threshold clipping device which is provided with a threshold determining time constant circuit responsive to the amplitude of the received signal. A second semiconductor amplifier is connected as a threshold amplifier having a threshold established at a point permitting only noise excursions in excess of sync amplitude to pass. By connecting the output circuit of the second threshold amplifier in series with the threshold determining time constant of the first amplifier, a noise cancellation effect is made possible in which received noise bursts are prevented from charging up the threshold determining time constant circuit of the first amplifier. In one preferred form of the invention, demodulation of the I. F. carrier along with synchronizing signal clipping is accomplished by two complementary junction transistor amplifiers. Each transistor receives signals from a separate output winding on the intermediate frequency output transformer of the receiver. Both transistors are operated as threshold amplifiers, the first designated to clip both sync and noise while the second is designated to clip only noise. By applying output signal from the second amplifier to the first amplifier in the proper phase relation, noise charge up and paralyzation of the sync clipping action is prevented.

It is therefore an object of the present invention to provide an improved synchronizing signal separating circuit for television receivers.

It is a further object of the present invention to provide an improved synchronizing signal separating circuit employing semiconductor amplifiers so arranged as to provide a substantial degree of noise cancellation.

It is a further object of the present invention to provide an improved and simplified arrangement employing complementary junction type transistors for use in television receivers to provide an improved sync clipping action providing a substantial degree of noise cancellation.

A better understanding of the present invention as well as other of its objects and features of advantage will become apparent upon reading of the following specification, especially when considered in the light of the accompanying drawings, in which.

Figures 1, 2:
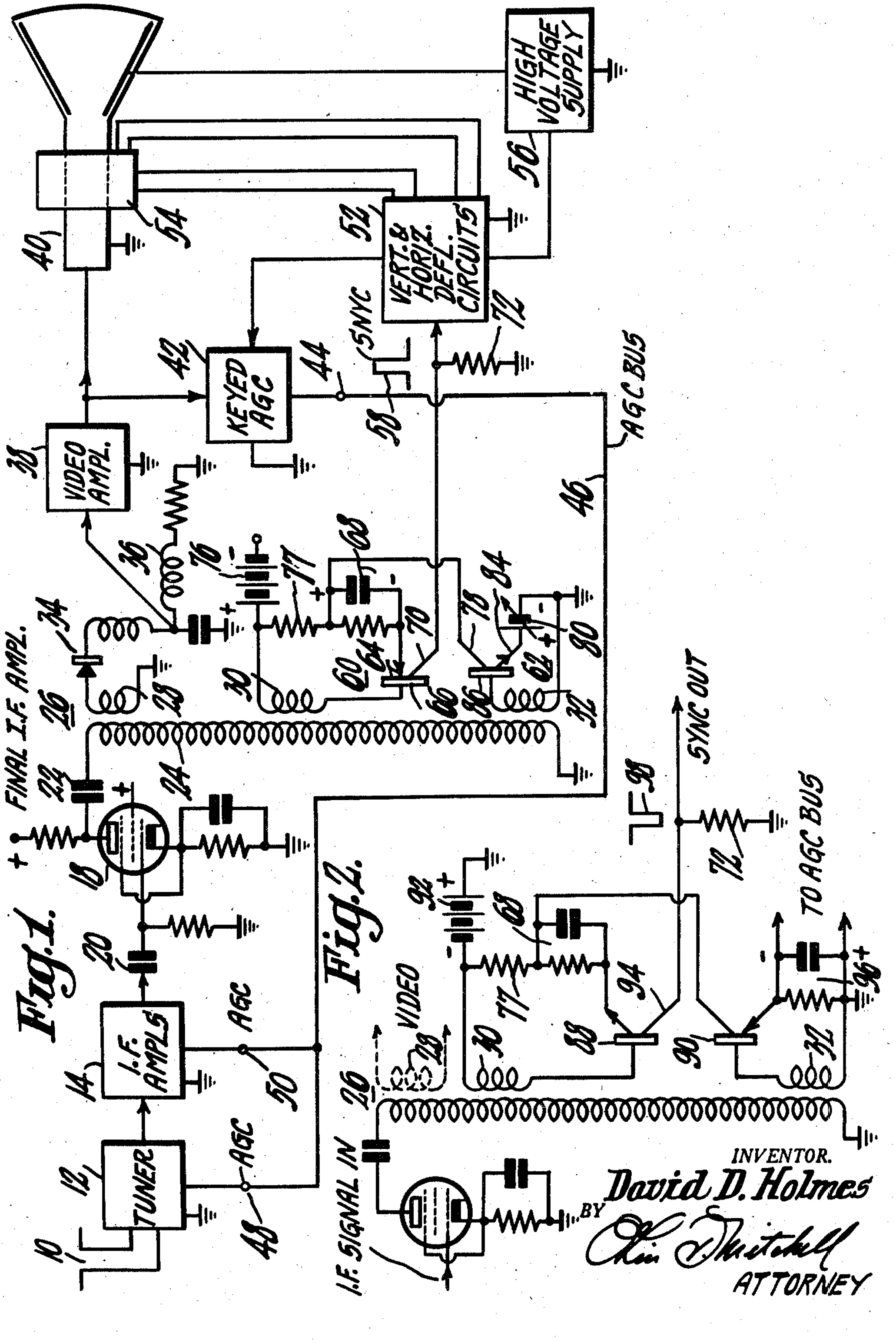
Fig. 1 is a combination block and schematic representation of a television receiver embodying the present invention.
Fig. 2 is a schematic representation of another form of the present invention suitable for use in a television receiving circuit of the type shown in Fig. 1.

Turning now to Fig. 1, there is shown a television signal receiving antenna 10 coupled with a conventional television tuner 12. The intermediate frequency signal developed by the tuner 12 is applied to the intermediate frequency amplifiers of block 14. A final I. F. amplifier 18 is shown to be capacitively coupled via capacitor 20 to the intermediate frequency amplifiers 14. Intermediate frequency signal developed at the anode of the amplifier 18 is capacitively coupled via capacitor 22 to the primary winding 24 of the intermediate frequency output transformer 26.

The transformer 26 is provided with three secondary windings at 28, 30 and 32 respectively. Secondary winding 28 is connected with the diode detector 34 for demodulation of the intermediate frequency carrier to develop across the load circuit 36 a video signal suitable for application to the video amplifier 38. Amplified video signal is then coupled from the amplifier 38 to the kinescope 40 for control of the beam current therein. Video signal delivered by the video amplifier 38 is also applied to the keyed automatic gain control circuit (AGC) 42 which samples the amplitude of the received signal and develops an AGC potential at the output terminal 44. The AGC potential at terminal 44 is applied to the AGC bus 46 which is in turn connected with the AGC terminals 48 and 50 of the tuner 48 and intermediate frequency amplifiers 14 respectively.

The keyed AGC circuit 42 obtains its keying pulses in a conventional manner from the deflection circuits 52. Deflection circuits 52 are also connected with the deflection coil assembly 54 for driving of the horizontal and vertical deflection coils. A high voltage supply circuit 56 is also shown connected with the deflection circuits for supply of beam accelerating potential to the kinescope 40.

In accordance with the present invention, separated synchronizing signal 58 is supplied to the deflection circuits 52 through the action of two semiconductor amplifiers at 60 and 62 respectively. By way of example, the amplifiers 60 and 62 may be of the junction transistor variety. The transistor 60 may be of the P–N–P type and transistor 62 of the N–P–N type. Transistor 60 is provided with an input circuit defined between the emitter 64 and the base 66, which input circuit is in effect connected across the secondary winding 30. A time constant circuit 68 is connected in series with the input circuit and is responsive to current flow therein to develop a reverse bias in the input circuit as indicated by the potential designations at the extremities of the time constant circuit.

An output circuit is also connected with the transistor 60 and is defined between the collector 70 through a load resistor 72 through the bias source 76 to the transistor emitter.

In accordance with the present invention a noise cancelling impedance or resistor 77 is connected in series with the time constant circuit 68. The collector 78 of transistor 62 is then connected to the junction between the noise cancelling resistor 77 and the time constant circuit 68. Due to the complementary nature of the transistors 60 and 62 the bias source 76 acts in proper polarity on the collector 78 to establish transistor amplifying action in the transistor 62. However, threshold bias potential means 80, which may take any convenient form, supplies a reverse cutoff bias in the input circuit of the transistor 62 defined between the emitter 84 and the base 86.

The operation of the embodiment of the present invention shown in Fig. 1 may be best understood by first considering the action of the transistor 60 upon receipt of a television signal. Modulated I. F. carrier is applied between the emitter 64 and the base 66 by virtue of the secondary winding 30. Current will flow through the emitter in the direction of the arrow indicated on the emitter 64. Such a current flow will develop a bias across the time constant circuit 68 which is of an electrical sense tending to oppose emitter current flow. If the time constant 68 is made long enough current flow in the emitter circuit can be restricted to only those intervals corresponding to the reception of synchronizing pulses. In other words, the bias developed across the time constant circuit 68 is caused to be sufficiently large to bias the transistor 60 beyond cutoff for all signals having amplitudes below the well known television blanking level or black level. This blanking level corresponds to the base of the synchronizing pulse 58. This ensures that the only collector current which will flow through the load resistor 72 will correspond to separated synchronizing pulses and noise excursions in excess of the blanking amplitude.

Further considering the operation of the embodiment of the invention shown in Fig. 1, it is clear that should a noise pulse of sufficiently large magnitude occur, the time constant 68 may charge up sufficiently with a reverse bias to maintain the transistor 60 at cutoff for a period perhaps longer than several synchronizing pulse periods. To avoid this the transistor 62, in accordance with the present invention, is provided with a threshold bias means 80 of a value which prohibits current flow through the transistor 62 except for signals representing an amplitude higher than the peak of the synchronizing signals. This last category of signals of course refers to noise or other spurious signals which would tend to missynchronize the deflection action if permitted to reach the deflection circuits. It is therefore observed that for all practical purposes only noise current will flow in the output circuit of the transistor 62. Since transistors 60 and 62 are complementary the phase of noise signal variations in the output circuits of the two transistors will be opposite to one another. The collector 78 may then be connected with the noise cancelling resistor 77 to in effect cancel noise in the input circuit of transistor 60 before the noise has the opportunity to charge up the time constant circuit 68.

In Fig. 2, a similar type of television receiving system is shown incorporating the novel features of the present invention. All elements and circuit arrangements up to and including the output transformer 76 may be thought of as identical to corresponding elements in Fig. 1. In Fig. 2, however, although the transistors 88 and 90 are complementary to one another they have their roles reversed with respect to the arrangement shown in Fig. 1. Here a P-N-P transistor 90 is acting as a noise detecting transistor amplifier while the N-P-N transistor 88 is caused to act as a sync separator. The time constant circuit 68 and canceling resistor 77 are included in the input circuit of the transistor 88 in a manner described in connection with Fig. 1. Due to the reversed nature of the required transistor polarizations a negative power supply 92 is required to reverse bias the collector 94 of the transistor 88. The polarity of the bias source 92 is therefore the reverse of the bias source 76 shown in Fig. 1. Since the polarity of the transistors 88 and 90 has been changed, the signal 98 appearing across the load resistor 72 will correspond to a negative-going synchronizing pulse in contrast to the positive-going pulse 58 shown in Fig. 1.

Another feature of the present invention illustrated in Fig. 2 is the provision for the noise detector transistor 90 of a variable threshold bias which varies with incoming signal strength. This ensures that the noise output of transistor 90 will always correspond to those signal excursions having amplitudes in excess of the synchronizing component of the television signal for a wide range of incoming signal strengths. This bias is obtained by connecting the upper terminal of the time constant network 96 to the AGC bus, as for example shown at 46 in Fig. 1. As received signal strength decreases the negative cutoff bias on the transistor 90 will decrease hence permitting conduction on less amplitude signal excursions.

Noise passed by the transistor 90 acts in opposition to the same noise as it affects the input circuit of the transistor 88. In this way, noise cancellation takes place across resistor 77 to provide a substantially noise free sync signal 98. The signal 98 can be applied to any suitable forms of vertical and horizontal deflection circuits as for example indicated by block 52 in Fig. 1.

What is claimed is:

1. In a television signal receiving system the combination of: television signal transducing means developing as an output signal an intermediate frequency version of received television signals, said version including a carrier having maximum amplitude excursions corresponding to a fixed percentage of modulation and representing deflection synchronizing pulses and subject to noise excursions exceeding in amplitude said synchronizing pulses; an output transformer having a primary winding operatively coupled with said signal transducing means and also having a first and second secondary windings across which are developed intermediate frequency signals substantially identical in character to each other and to said input signal; a load resistor; a first semiconductor amplifier means having an input circuit connected across said first secondary winding and having an output circuit including said load resistor; time constant means connected in series with said input circuit and responsive to current flow therein to develop a reverse bias in said input circuit as a function of applied signal amplitude, said bias being of a value permitting conduction in said amplifier only during said maximum amplitude excursions; a cancelling resistor connected in series with said input circuit; a second semiconductor amplifier means having an input circuit connected across said second secondary winding and having an output circuit; connections placing said cancelling resistor in series with said second amplifier output circuit and with such electrical sense as to develop in said cancelling resistor a current opposing input signal current variations otherwise flowing in said first amplifier input circuit; and reverse threshold bias means connected in said second amplifier input circuit of a value preventing output current flow in said second amplifier for signal excursions in said second secondary winding less than the said maximum amplitude excursions such that output current flows in said second amplifier only during noise excursions whereby noise immune separated synchronizing pulses will appear across said first amplifier load resistor.

2. A television signal receiving system according to claim 1 wherein there is additionally provided automatic gain control means connected with said signal transducing means and productive of a control voltage whose magnitude represents received signal strength and wherein said second amplifier reverse threshold bias means includes a connection between said automatic gain control means and said second amplifier input circuit so as to apply said control voltage to said input circuit with such electrical sense that said threshold increases in response to an increase in received signal strength.

3. In a television signal receiving system the combination of: a source of carrier signal modulated with a composite television signal having peak excursions corresponding to deflection synchronizing pulses having a base portion and a peak portion; a coupling transformer having a primary winding and at least a first and a second secondary windings, said primary winding being operatively coupled to said carrier signal source to develop modulated carrier representations across said secondary windings; a first semiconductor amplifier means having an input circuit and an output circuit; means operatively coupling said input circuit to said first secondary winding for amplifying signals appearing across said first secondary winding; bias means operatively connected with said first semiconductor amplifier to prevent signal translation to said output circuit of substantially all signals having excursions of less amplitude than the base portion of said synchronizing pulses; a second semiconductor amplifier means having an input circuit and an output circuit; means operatively coupling said second amplifier input circuit to said second secondary winding for amplifying signals appearing across said second secondary winding; bias means operatively connected with said second semiconductor amplifier for preventing signal translation to said second amplifier output circuit of substantially all signals having excursions of less amplitude than the peak portion of said synchronizing pulses; impedance means common to the output circuit of said second semiconductor amplifier and the input circuit of said first semiconductor amplifier in such connection thereto as to combine signals from said second semiconductor amplifier in cancelling relation to corresponding signals appearing in said first semiconductor amplifier input circuit; deflection circuit means having a synchronizing signal input terminal; and means coupling said first semiconductor output circuit to said deflection circuit input terminal.

4. In a television signal receiving system the combination of: a source of carrier signal modulated with a composite television signal having peak excursions corresponding to deflection synchronizing pulses having a base portion and a peak portion; a coupling transformer having a primary winding and at least two secondary windings, said primary winding being coupled to said carrier signal source; a first semiconductor amplifier means having electrodes corresponding to a base, emitter, and collector; an input circuit operatively connected with said emitter; an output circuit operatively connected with said collector; means operatively coupling said input circuit to said first secondary winding to drive said amplifier with carrier signal; a resistance-capacitance time constant circuit means serially connected in said input circuit and responsive to the flow of semiconductor emitter current to develop a reverse bias of a magnitude which is a direct function of the amplitude of signal appearing across said first secondary winding, said time constant circuit being of a value developing a reverse bias of a magnitude preventing signal translation to said output circuit of substantially all signals having excursions of less amplitude than the base portion of said synchronizing pulses; a second semiconductor amplifier means having electrodes corresponding to a base, emitter, and collector; an input circuit operatively connected with said emitter; an output circuit operatively connected with said collector; means coupling said second amplifier input circuit to said second secondary winding; bias means connected with said second semiconductor amplifier for preventing signal translation to said second amplifier output circuit of substantially all signals having excursions of less amplitude than the peak portion of said synchronizing pulses; an impedance connected in common with both said second semiconductor amplifier output circuit and said first semiconductor input circuit in such a manner as to combine signals from said second semiconductor amplifier in cancelling relation to corresponding signals in said first semiconductor input circuit to provide signals in said first output circuit which are substantially free of information representing excursions exceeding the amplitude of said synchronizing pulses; deflection circuit means having a synchronizing signal input terminal; and means coupling said first semiconductor output circuit to said deflection circuit input terminal.

5. In a television signal receiving system the combination of: a source of carrier signal modulated with a composite television signal having peak excursions corresponding to deflection synchronizing pulses having a base portion and a peak portion; a coupling transformer having a primary winding and at least two secondary windings said primary winding being coupled to said carrier signal source; a first semiconductor amplifier means having an input circuit and an output circuit; means coupling said input circuit to said first secondary winding; a resistance-capacitance time constant circuit means serially connected in said input circuit and responsive to the flow of semiconductor emitter current to develop a reverse bias of a magnitude which is a direct function of the amplitude of the signal appearing across said first secondary winding, said time constant circuit being of a value developing a reverse bias of a magnitude preventing signal translation to said output circuit of substantially all signals having excursions of less amplitude than the base portion of said synchronizing pulses; a second semiconductor amplifier means having an input circuit and an output circuit; means coupling said second amplifier input circuit to said second secondary winding; control signal developing means coupled with said carrier signal source, said control signal having an amplitude which is a function of carrier intensity; means coupled with said control signal developing means and said second semiconductor amplifier input circuit to apply a said control signal thereto as a bias so as to prevent signal translation to said second semiconductor output circuit of substantially all signals having excursions of less amplitude than the peak portion of said synchronizing pulses; an impedance connected in series with said second semiconductor amplifier output circuit and said time constant circuit in such a manner as to combine signals from said second semiconductor amplifier in cancelling relation to corresponding signals in said first semiconductor input circuit; deflection circuit means having a synchronizing signal input terminal; and means coupling said first semiconductor output circuit to said deflection circuit input terminal.

6. In a radio receiving system designated to receive and demodulate a radio carrier amplitude modulated at least in part by datum signals represented by peak carrier excursions of a relatively fixed modulation percentage, said radio carrier being subject to fortuitous noise interference represented by signal excursions in excess of said fixed modulation percentage, the combination of: a first amplifier means connected to accept incoming radio signals to produce an output signal representing an amplified electrical signal representation of said radio signals; a second amplifier of the semiconductor variety having connected therewith an input circuit and an output circuit, said input circuit requiring therein a forward current flow of a value directly related to applied signal amplitude as a condition for output circuit current flow; means coupling said first amplifier output signal to said second amplifier input circuit for driving thereof; load means connected in the output circuit of said second amplifier for developing an output signal; current responsive self biasing means connected in series with said second amplifier input circuit and of such structure as to develop a reverse threshold bias of a value preventing input circuit flow for signal excursions substantially less than said peak excursions to develop in said output load signals representing only the upper extremities of said peak excursions along with fortuitous noise excursions; a third amplifier device of the semiconductor variety having connected therewith an input circuit and an output circuit; means coupling said first amplifier output circuit to said third amplifier input circuit for driving thereof; variable threshold reverse bias means connected in series with said third amplifier input circuit for normally maintaining said third amplifier in a nonconducting state, the value of said reverse bias being such to permit conduction only on noise signal excursions in excess of said datum; and means connecting the output circuit of said third amplifier device with a portion of second amplifier device input circuit with such polarity as to oppose conduction in said second amplifier input circuit in response to conditional noise signal conduction in said third amplifier.

7. In a television receiving system the combination of: a source of intermediate frequency carrier containing amplitude modulation corresponding to a composite television signal and in which peak carrier excursions correspond to television signal synchronizing pulses; a transformer having a primary winding and at least a first and a second secondary windings; a first and a second semiconductor amplifiers each having electrodes corresponding to a base emitter and collector, said second semiconductor amplifier being substantially complementary to said first semiconductor amplifier; connections placing said first amplifier emitter-base path across said first secondary winding; resistance means interposed in series with said emitter-base path between said emitter and said first secondary winding; a capacitor connected between said emitter and a point on said resistance means; an output resistor for said first amplifier; collector reverse bias means connected in series with said output resistor between said first amplifier collector and the junction point of said resistance means with said first secondary windings; connections placing said second secondary winding between said second amplifier base and the bias source extremity of said output resistor; reverse bias means connected between said second amplifier emitter and said bias source extremity of said resistor winding, the value of reverse bias provided by said means being such as to prohibit emitter current flow for all signal excursions except those in excess of said peak carrier excursions corresponding to synchronizing pulses; coupling means connecting said second amplifier collector to a point on said resistance means not embraced by said capacitor; a deflection circuit having a synchronizing signal input terminal; and coupling means from said output resistor to said synchronizing signal input terminal, the value of said capacitor and said resistance means being so selected as to develop a reverse bias between the emitter and base of said first amplifier of a value permitting forward emitter current flow only in response to signals having peak excursions at least equal to the lowest amplitude portion of said synchronizing pulse excursions.

8. A television receiving system according to claim 7 wherein one of said semiconductor amplifiers is of the N–P–N junction transistor variety while the other of said semiconductor amplifiers is of the P–N–P junction transistor variety.

9. A television receiving system according to claim 8 wherein there is additionally provided an automatic gain control circuit coupled with said source of intermediate frequency carrier for developing a potential representing received signal strength and wherein there is also provided a connection from said automatic gain control circuit to said second amplifier emitter so that the value of reverse bias on said second amplifier is rendered a function of received signal strength.

10. A transistor noise cancellation circuit for use in a television receiver comprising in combination: a source of electrical signals representing received television signal intelligence, said electrical signals including a high amplitude periodically recurrent synchronizing pulse component and a relatively low amplitude video component, said signals randomly including noise components of an amplitude in excess of said synchronizing component; a first transistor having a base, emitter and collector; a first direct current conducting input circuit connected between said emitter and base including a first and a second resistance means connected in series; means operatively coupling said signal source to said first input circuit to drive said first transistor with electrical signals of sufficient amplitude and electrical polarity to develop emitter current flow of a magnitude which is a function of the amplitude of said synchronizing pulse component; a first direct current conducting output circuit direct current connected with said emitter and said collector to permit output current flow, said output circuit including an output load resistor and a collector bias source which biases said collector in reverse conducting relation to said base; a capacitor connected in shunt with said first resistance means to form a time constant circuit the value of which is larger than the periodicity of said synchronizing component such that a reverse emitter base bias is developed thereacross of a value which is a function of the amplitude of synchronizing component and of a nominal value preventing collector output current flow except for signal excursions of an amplitude larger than the lowest amplitude representation of said synchronizing pulse component; a second transistor having a base emitter and collector and having an operating characteristic which is complementary to said first transistor; a second direct current conductive input circuit connected between said base and said emitter and including impedance means; output means for said second transistor comprising a direct current conducting connection from said second transistor collector to said second resistance means so as to apply said collector bias source in operative relation to said second transistor emitter; a direct current conducting path defining means connected between said first and second input circuits to provide a direct current path for output circuit of said second transistor; reverse bias means serially connected in said second input circuit to prevent emitter conduction in said second transistor for all signal excursions below the peak value of said synchronizing component whereby noise components tend to be cancelled across said second resistance means to provide a separated synchronizing signal across said first transistor output load resistance which is substantially free of noise components.

11. A noise cancellation and synchronizing pulse separation circuit for a television receiver, comprising in combination: a source of television signal having a high amplitude periodically recurrent synchronizing pulse component and a lower amplitude video component, said television signal having noise contamination components randomly exceeding in amplitude said synchronizing pulse component; a first and a second transistor having complementary characteristics with respect to one another; input circuit means operatively connected with each transistor and coupled with said signal source for driving said transistors with said signals; output circuit means operatively coupled with each transistor for developing output signals representing amplified versions of at least a portion of the signals applied to said input circuits; reverse bias means included in said first transistor input circuit preventing amplification of signals having amplitude excursions below the lowest amplitude portion of said synchronizing pulse component; reverse bias means included in said second transistor input circuit preventing amplification of signals having amplitude excursions below the highest amplitude portion of said synchronizing pulse component, whereby said second transistor is effective to amplify substantially only those signal excursions representing said noise components; and impedance means direct current connected in the input circuit of said first transistor and the output circuit of said second transistor such that direct current flow from said second transistor output circuit traverses a portion of said first transistor input circuit, the value of said impedance means being such to permit cancellation in said first transistor input circuit of noise contamination components amplified by said second transistor to cause cancellation of noise contamination components in said first transistor input circuit so that separated synchronizing pulse components substantially free of noise appear in said first transistor output circuit.

References Cited in the file of this patent

UNITED STATES PATENTS 2,699,463 Kroger et al. ------------ Jan. 11, 1955